(12) United States Patent
Taylor et al.

(10) Patent No.: US 8,659,408 B2
(45) Date of Patent: Feb. 25, 2014

(54) OBJECT DETECTION SYSTEM AND METHOD USING A CAMERA AND A MULTIPLE ZONE TEMPERATURE SENSOR

(75) Inventors: Ronald M. Taylor, Greentown, IN (US); Jeremy S. Greene, Mccordsville, IN (US)

(73) Assignee: Delphi Technologies, Inc., Troy, MI (US)

( * ) Notice: Subject to any disclaimer, the term of this patent is extended or adjusted under 35 U.S.C. 154(b) by 93 days.

(21) Appl. No.: 13/477,122

(22) Filed: May 22, 2012

(65) Prior Publication Data

US 2013/0314221 A1   Nov. 28, 2013

(51) Int. Cl.
*B60Q 1/00* (2006.01)

(52) U.S. Cl.
USPC ........... 340/435; 340/436; 340/903; 340/905; 340/932.2; 340/942

(58) Field of Classification Search
USPC ............... 340/345, 346, 903, 905, 932.2, 942
See application file for complete search history.

(56) References Cited

U.S. PATENT DOCUMENTS

| | | | |
|---|---|---|---|
| 4,967,276 A | 10/1990 | Murakami et al. | |
| 5,001,558 A | 3/1991 | Burley et al. | |
| 5,936,666 A | 8/1999 | Davis | |
| 7,042,345 B2 * | 5/2006 | Ellis | 340/436 |
| 7,439,507 B2 | 10/2008 | Deasy et al. | |
| 7,932,835 B2 | 4/2011 | Taylor et al. | |
| 2010/0277298 A1 | 11/2010 | Leong et al. | |

OTHER PUBLICATIONS

Category 6—Sensors and Lasers, Export Administration Regulations Bureau of Industry and Security , Jun. 16, 2011; US Commerce Control List, Supplement No. 1 to Part 774, Category 6, p. 1.

* cited by examiner

*Primary Examiner* — Tai T Nguyen
(74) *Attorney, Agent, or Firm* — Lawrence D. Hazelton (57) ABSTRACT

A system and method to provide a notification to an operator of a vehicle that an object is proximate to the vehicle. Data from a visible light camera and a multiple zone temperature sensor are combined or fused to determine which regions of a display should be highlighted in order to help the vehicle operator better notice or discern an object shown on a display. The region or area of the display highlighted is determined by displaying a highlighted area or icon on the display corresponding to an area where objects detected on image data maps of hue and/or saturation and/or intensity data from the camera intersect with objects detected on a temperature data map from the temperature sensor. Misalignment between the camera and the temperature sensor may be tolerated by expanding the object detected on the various maps in order to increase the probability of an intersection occurring.

13 Claims, 6 Drawing Sheets

OBJECT DETECTION SYSTEM AND METHOD USING A CAMERA AND A MULTIPLE ZONE TEMPERATURE SENSOR

TECHNICAL FIELD OF INVENTION

This disclosure generally relates to object detection for vehicle collision avoidance, and more particularly relates to a way to combine or fuse information from a visible light camera and a multiple zone temperature sensor so a vehicle operator can more readily detect an object proximate to the vehicle.

BACKGROUND OF INVENTION

Vehicle operator warning systems that alert vehicle operator of objects that may be a collision hazard are known. These systems typically provide the operator an audio and/or visual warning of an impending or potential collision, preferably with sufficient reaction time for the vehicle operator to respond to the warning and make appropriate countermeasures to prevent the collision.

Rear view camera systems that allow the operator to view areas behind the vehicle are also known. These systems help the operator to detect objects blocked from view by the rear portion of the vehicle, or are located in areas commonly known as blind spots. However, even if the vehicle is equipped with a rear view camera system, the operator may not be able to discern potential obstacles displayed by the system. For example, the wide range of ambient lighting conditions experienced by the vehicle, combined with the wide range of reflectivity values of potential objects can make object identification and or classification difficult.

Thermal imaging cameras or infrared cameras have also been used in automotive applications for object detection. However, such cameras have undesirably high cost. Also, some operators have difficulty interpreting what is being indicated in the thermal image as they often resemble an antiquated black and white television display.

SUMMARY OF THE INVENTION

In accordance with one embodiment, a system to provide a notification to an operator of a vehicle that an object is proximate to the vehicle is provided. The system includes a visible light camera, a multiple zone temperature sensor, and a controller. The visible light camera is mounted on the vehicle effective to have a camera field of view, and configured to output image data indicative of visible light color and visible light intensity detected by pixels in the camera. The multiple zone temperature sensor is mounted on the vehicle effective to have a sensor field of view similar to the camera field of view, and configured to output temperature data indicative of a zone temperature for each of the multiple zones. The controller is configured to a) receive visible light image data from the camera, said image data indicative of visible light color and visible light intensity detected by pixels in the camera, b) determine a hue map characterized as an array of hue data cells, wherein each hue data cell has a hue value based on a hue characteristic of the image data detected by of one or more of the pixels, c) designate a hue object on an area of the hue map where a cluster of hue data cells are present that have notable hue values relative to a hue threshold, d) determine a saturation map characterized as an array of saturation data cells, wherein each saturation data cell has a saturation value based on a saturation characteristic of the image data detected by of one or more of the pixels, e) designate a saturation object on an area of the saturation map where a cluster of saturation data cells are present that have notable saturation values relative to a saturation threshold, f) determine an intensity map characterized as an array of intensity data cells, wherein each intensity data cell has an intensity value based on an intensity characteristic of the image data detected by of one or more of the pixels, g) designate an intensity object on an area of the intensity map where a cluster of intensity data cells are present that have notable intensity values relative to an intensity threshold, h) receive temperature data from the multiple zone temperature sensor, wherein said temperature data includes a zone temperature value for each of the multiple zones, i) determine a temperature map characterized as an array of temperature data cells, wherein each temperature data cell has a temperature value based on a temperature characteristic of one or more of the multiple zones, j) designate a temperature object on an area of the temperature map where a cluster of temperature data cells are present that have notable temperature values relative to a temperature threshold, k) designate a detected object on an area of an object map where the hue object, the intensity object, and the temperature object intersect, or where the saturation object, the intensity object, and the temperature object intersect, and l) output a display signal corresponding to an image from the camera that includes a highlighted area selected based on the detected object.

In another embodiment, a method to provide a notification to an operator of a vehicle that an object is proximate to the vehicle is provided. The notification is based on image data from a visible light camera mounted on the vehicle effective to have a camera field of view, and a multiple zone temperature sensor mounted on the vehicle effective to have a sensor field of view similar to the camera field of view. The method includes the steps of a) receiving visible light image data from the camera, said image data indicative of visible light color and visible light intensity detected by pixels in the camera, b) determining a hue map characterized as an array of hue data cells, wherein each hue data cell has a hue value based on a hue characteristic of the image data detected by of one or more of the pixels, c) designating a hue object on an area of the hue map where a cluster of hue data cells are present that have notable hue values relative to a hue threshold, d) determining a saturation map characterized as an array of saturation data cells, wherein each saturation data cell has a saturation value based on a saturation characteristic of the image data detected by of one or more of the pixels, e) designating a saturation object on an area of the saturation map where a cluster of saturation data cells are present that have notable saturation values relative to a saturation threshold, f) determining an intensity map characterized as an array of intensity data cells, wherein each intensity data cell has an intensity value based on an intensity characteristic of the image data detected by of one or more of the pixels, g) designating an intensity object on an area of the intensity map where a cluster of intensity data cells are present that have notable intensity values relative to an intensity threshold, h) receiving temperature data from the multiple zone temperature sensor, wherein said temperature data includes a zone temperature value for each of the multiple zones, i) determining a temperature map characterized as an array of temperature data cells, wherein each temperature data cell has a temperature value based on a temperature characteristic of one or more of the multiple zones, j) designating a temperature object on an area of the temperature map where a cluster of temperature data cells are present that have notable temperature values relative to a temperature threshold, k) designating a detected object on an area of an object map where the hue object, the intensity object, and the temperature object intersect, or where the saturation object, the intensity object, and the temperature object intersect, and l) displaying on a display an image from the camera that includes a highlighted area selected based on the detected object.

In yet another embodiment, a controller for the system described above is provided.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
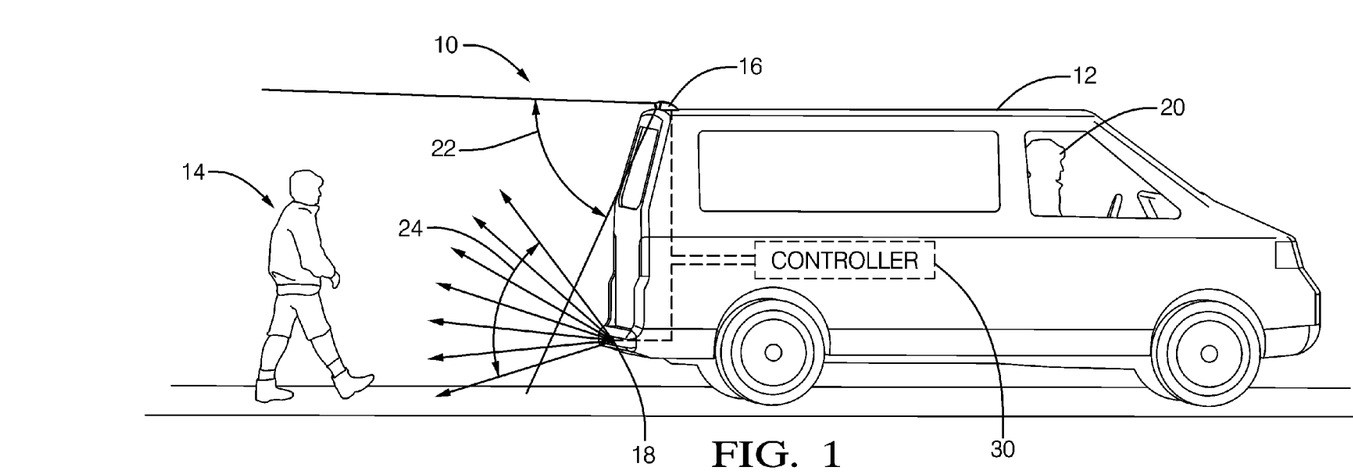
FIG. 1 is a perspective view of an object behind a vehicle equipped with an object detection system in accordance with one embodiment.

FIG. 1 illustrates a non-limiting example of a system 10 generally configured to provide an operator 20 of a vehicle 12 a notification that an object 14 is proximate to the vehicle 12. In this example, the object 14 is a child that is located behind the vehicle 12. The system 10 is also useful to detect an adult, an animal, other vehicle, or any obstruction that the vehicle 12 may collide with. The system 10 includes a visible light camera 16 and a multiple zone temperature sensor 18. In general, the camera 16 is mounted on the vehicle 12 in order to have a camera field of view 22 useful to detect objects that may not be readily seen by the operator 20. In this non-limiting example, the camera field of view 22 is directed behind the vehicle 12. However, it will be apparent that the system 10 could be configured to detect an object beside or in front of the vehicle 12. In general, the sensor 18 is mounted on the vehicle 12 in order to have a sensor field of view 24 that is also useful to detect objects that may not be readily seen by the operator 20 because, for example, the object 14 is behind the vehicle 12.

In this example, the camera 16 and the sensor 18 are illustrated as being substantially separated only for the purpose of illustration. It is recognized that the camera 16 and the sensor 18 are preferably co-located so that both have essentially the same field of view. If the camera 16 and sensor 18 are separated, known image processing techniques may be used to transform the apparent fields of view to substantially correspond. As used herein, having the sensor field of view 24 similar to the camera field of view 22 means that if the object 14 is present in one field of view at a location where the vehicle 12 may, for example, back into or over the object 14, the object 14 is also present in the other field of view.

Figure 2:
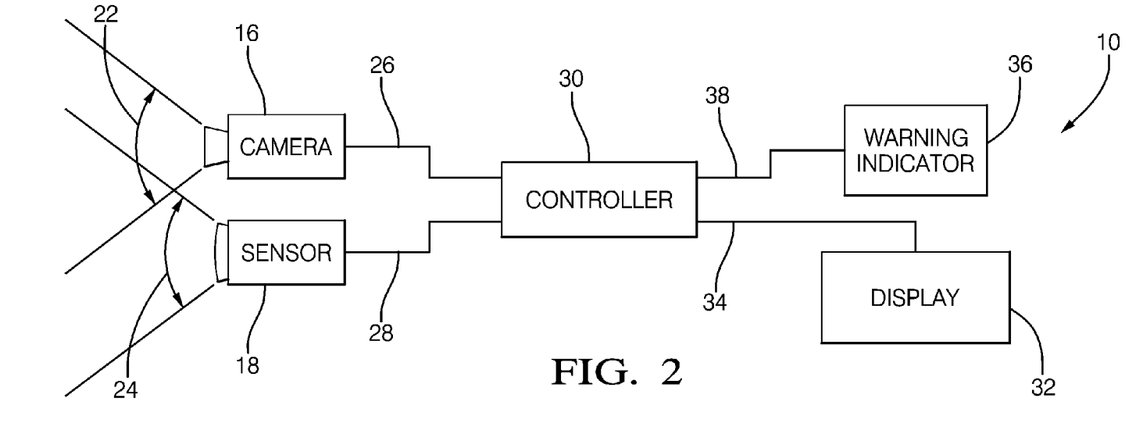
FIG. 2 is a diagram of the system of FIG. 1 in accordance with one embodiment.

FIG. 2 further illustrates a non-limiting example of the system 10. The camera 16 is generally configured to output image data 26 indicative of visible light color, for example hue and saturation, and visible light intensity detected by pixels (not shown) in the camera 16. A suitable resolution for the camera may be provide by a pixel array characterized as 640 by 480 for a total of 307,200 pixels. Cameras of higher and lower resolution are commercially available from a wide variety of sources. The camera needs to have sufficient resolution so when the image data 26 is displayed to the operator 20, there is sufficient detail for the operator 20 to discern what is being displayed.

The multiple zone temperature sensor or the sensor 18 is generally configured to output temperature data 28 indicative of a zone temperature for each individual zone of the multiple zones in the sensor field of view 24. The individual zones are indicated by the plurality of arrows shown within the sensor field of view 24. The individual zones may each be relatively small regions that result in detection gaps between the individual zones, or the zones may be sized and shaped so most or all locations in the sensor field of view 24 are covered by one of the individual zones, or the zones may be sized and shaped so there is some overlap of the individual zones so some locations are covered by more than one of the individual zones. It should be appreciated that while FIG. 1 suggests that individual zones indicated by the arrows is a one-dimensional array, a two-dimensional array is contemplated so the plurality of arrows would include arrows in a side-to-side arrangement as well as the up-down arrangement illustrated. It is understood that the two-dimensional array thus measures temperature zones within and throughout the three-dimensional field of view. The sensor 18 may include an array of a plurality of thermopile sensors such as those available from Heimann Sensor GmbH located in Dresden, Germany. Using such arrays of thermopile sensors instead of an infrared (IR) camera is preferred to keep the cost of the system 10 low, an important factor for automotive applications.

A suitable resolution for the sensor 18 may be provided by a thermopile array of 32 by 31 thermopiles that may be configured to view 992 distinct temperature zones in the sensor field of view 24. As used herein, the multiple zone temperature sensor or the sensor 18 is a non-imaging thermal detector and is distinguished from an infrared camera at least because the resolution of the sensor 18 is too low for the operator 20 to discern what is being displayed by an image based solely on the temperature data 28. In other words, the resolution of the sensor 18 is too coarse for the temperature data 28 to form a meaningful image for the operator 20. The Bureau of Industry and Security of the United States Department of Commerce has issued regulations titled US Commerce Control List Supplement 1 Part 774 (see www.bis.doc.gov/policiesandregulations/ear/index.htm), and those regulations (see Category 6—Sensors and Lasers, page 9) define non-imaging thermal detector by stating that "Imaging thermal detectors are a multi-element array of thermal detectors with the capacity to form a visual, electronic or other representation of an object with sufficient fidelity to enable understanding of its shape or other spatial characteristics, such as height, width, or area. A multi-element array of thermal detectors without the capacity to form spatial representation of an object is non-imaging." As such, any infrared imaging device having a resolution greater than 4000 temperature zones (e.g. 64 by 62=3968 thermopiles) is specifically excluded from being comparable to the sensor 18.

As will become evident in the description that follows, the image data 26 and the temperature data 28 are combined or fused in a way so the operator 20 can more easily discern if an object 14 is present in the camera field of view 22. In particular, the system 10 fuses the visible light based image conveyed in the image data 26 with the coarse resolution information in the temperature data 28 to enhance what is displayed to the operator 20. By using a multiple zone temperature sensor (the sensor 18) instead of an infrared (IR) camera, the cost of the system 10 is reduced when compared to systems that suggest using a visible light camera (e.g. the camera 16) in combination with an IR camera. By fusing the image data 26 and the temperature data 28, an image displayed to the operator 20 may include highlighted regions that direct the operator's attention to the image of the object 14 shown on the display. Highlighting may help the operator 20 to more quickly and/or easily detect the object 14 when compared to rear view camera systems that only display visible light information, e.g. only display the image data 26. Examples of highlighting include flashing and/or blinking areas that appear to be overlays of the object 14, brightness sequencing of the area around or at the object 14, changing the color tint at or around the object 14, and/or placing an icon overlay near or at the object 14 to better discriminate the presence of the object 14 and thus enhance an alert/warning to the operator 20 of an object 14 that may not have been noticed otherwise.

Continuing to refer to FIG. 2, the system 10 may include a controller 30 configured to receive the image data 26 characterized as visible light image data from the camera 16. In general, the image data 26 is indicative of visible light color and visible light intensity of the scene in the camera field of view 22 as detected by pixels in the camera 16. The controller 30 is also configured to receive the temperature data 28 from the multiple zone temperature sensor (the sensor 18). The temperature data 28 includes a zone temperature value for each of the multiple zones in the sensor field of view 24.

The controller 30 may include a processor such as a microprocessor or other control circuitry as should be evident to those in the art. The controller 30 may include memory, including non-volatile memory, such as electrically erasable programmable read-only memory (EEPROM) for storing one or more routines, thresholds and captured data. The one or more routines may be executed by the processor to perform steps for processing signals received by the controller 30 for combining or fusing the image data 26 and the temperature data 28 as described herein.

The system 10 may also include a display 32 configured to display an image to the operator 20 that corresponds to a display signal 34 output by the controller 30. Devices suitable for the display 32 are commercially available. The display 32 may be located anywhere in the vehicle 12 where the operator 20 can readily view the display 32; for example as part of an instrument display panel directly forward of the operator, or as part of a centralized instrumentation arrangement between the operator seat and passenger seat, or as part of a rear-view mirror assembly. The system 10 may also include a warning indicator 36 such as an indicator light, audible alarm, or vibrating device coupled to the steering wheel or the operator's seat. In general, the warning indicator 36 is configured receive a warning signal 38 from the controller 30, and in response to the warning indicator 36 output a light, sound, haptic, or other action to attract the attention of the operator 20 when the object 14 is detected.

Figure 3:
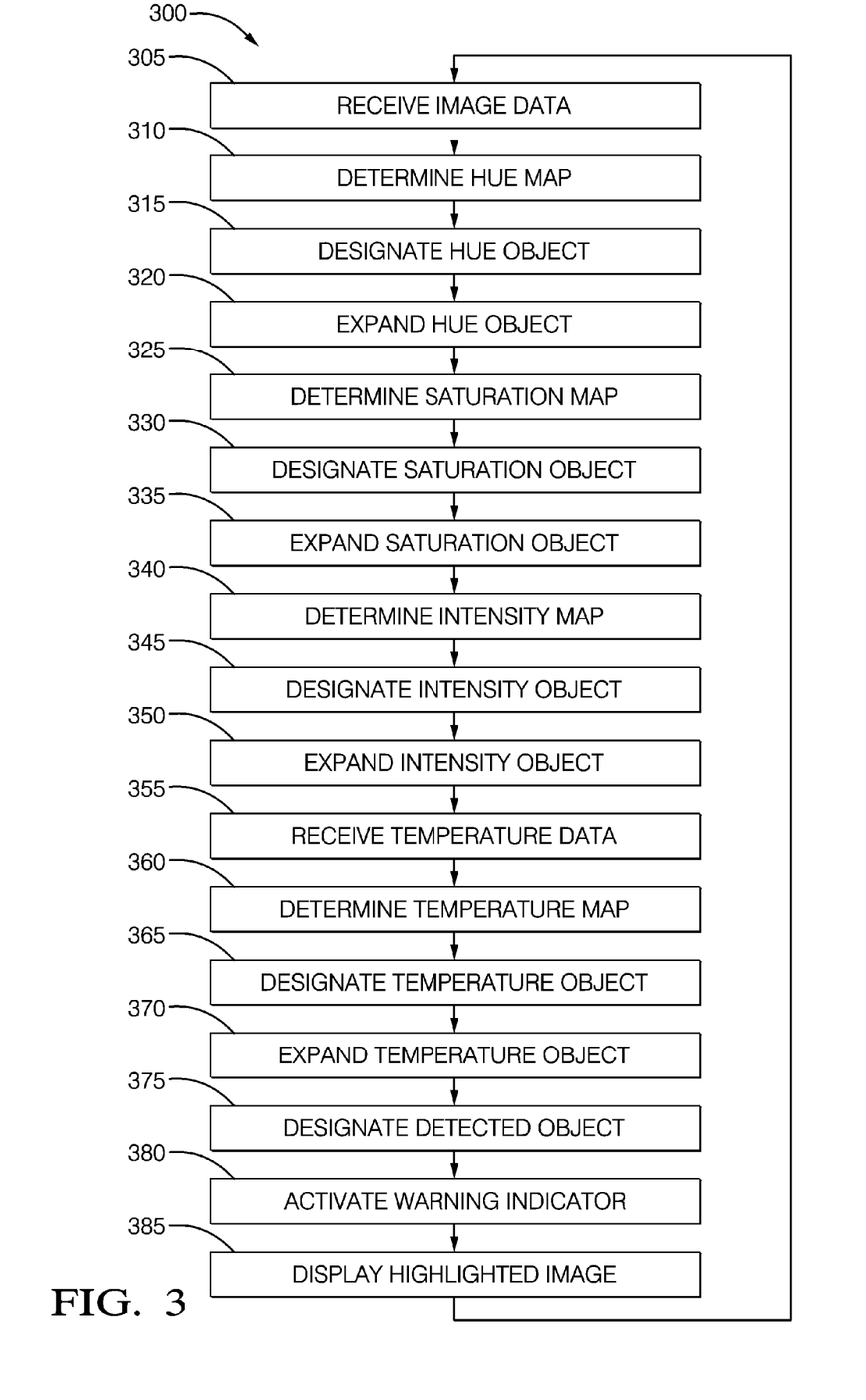
FIG. 3 is a flowchart of a method executed by the system of FIG. 1 in accordance with one embodiment.

FIG. 3 illustrates a method 300 to provide a notification to an operator 20 of a vehicle 12 that an object 14 is proximate to the vehicle 12. As describe above, the notification is generally based on image data 26 from a visible light camera 16 mounted on the vehicle 12 in a manner effective to have a camera field of view 22 of a particular area about the vehicle 12. The notification is also based on temperature data 28 from a multiple zone temperature sensor 18 mounted on the vehicle 12 in a manner effective to have a sensor field of view 24 similar to the camera field of view 22.

In general, and as will be explained in more detail below including by way of non-limiting examples, the system 10 seeks to detect the object 14 by examining various arrays of data cells that indicate attributes such as the hue values, saturation values, and intensity values as detected by pixels of the camera. If the resolution of the camera is greater than is necessary to detect the object 14, the values stored in each data cell of the various data arrays may be based on more than one pixel. The examination of these various arrays is directed to detecting a potential object by looking for instances of clusters of data having certain shapes, sizes, contrasts with surrounding backgrounds, and/or absolute values. Similarly, temperature zone data from the sensor 18 is stored in arrays and similarly examined for instances of clusters of data having certain shapes, sizes, contrasts, and/or absolute values. Then various combinations of these arrays or maps of the image data 26 and the temperature data 28 are compared, in effect 'overlaid' on one another, to look for instances where a potential object is present in more than one map.

Another feature of the system that will become apparent in the explanation below is present because it was recognized that potential misalignment between the camera field of view 22 and the sensor field of view 24 may cause smaller objects to go undetected. This is because when the arrays or maps are logically overlaid, and the two fields of view are misaligned, potential objects in the camera data based image maps may not coincide in location with potential objects in the sensor data based temperature maps. To address this problem, the apparent size of potential objects are increased or 'expanded' as described below to increase the chance of a potential object being confirmed or promoted to a detected object status because there is an intersection of the potential objects when the maps are overlaid.

Figure 4:
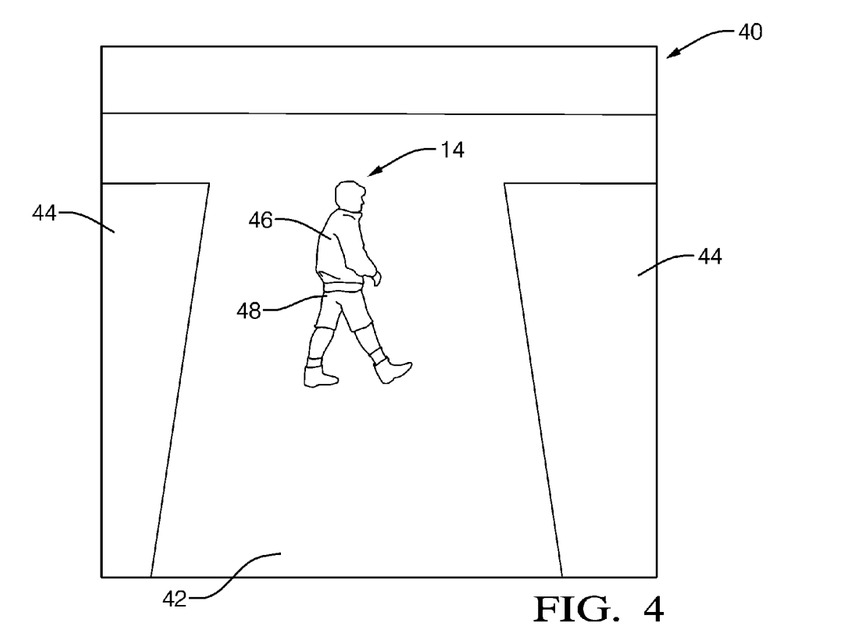
FIG. 4 is an example scene of the area behind the vehicle of FIG. 1 in accordance with one embodiment.

FIG. 4 illustrates a non-limiting example of an example scene 40 depicting a driveway 42 and a lawn 44 behind the vehicle 12 that is occupied by an object 14 depicted in this example as a child. For the description that follows it will be assumed that that the image data 26 and the temperature data 28 show the same perspective of the scene 40 because both the camera 16 and the sensor 18 are co-located, or the signals from the camera 16 and the sensor 18 have been processed so the perspectives appear the same or very similar. Also, for the purpose of explanation, the example child is wearing a shirt 46 and shorts 48 that are red in color, and the child's face, arms, and legs are exposed.

Referring again to FIG. 3, step 305, RECEIVE IMAGE DATA, may include receiving visible light image data 26 from the camera 16. In general, the image data 26 includes data indicative of the color of the visible light, for example hue (denotes the degree or dominant wavelength of a measured color) and saturation (denotes the amount of color contained compared to white light), and visible light intensity (denotes the brightness of the light) detected by pixels in the camera 16. It should be understood that the effects of pixilation on the image are not shown because it is assumed that the resolution is high enough so that the amount of pixilation of the image is small relative to the size or shape measures and so are not objectionable. As such, if the image data 26 were displayed on the display 32, the image shown would be similar to or is recognizable as what is shown in FIG. 4.

Step 310, DETERMINE HUE MAP, may include determining a hue map characterized as an array of hue data cells. These data cells may be locations in memory within the controller 30. In general, each hue data cell has a hue value based on a hue characteristic of a portion of the image data detected by of one or more of the pixels in the camera 16 corresponding to the portion of camera field of view 22. By way of example and not limitation, the hue value may be a number between zero (0) and three hundred sixty (360) where zero is used to designate red, one hundred twenty (120) is used to designate green, two hundred forty (240) is used to designate blue, three hundred sixty (360) is used to designate violet, and other intermediate values are used to designate colors of the color spectrum as is well known.

Step 315, DESIGNATE HUE OBJECT, may include designating a hue object on an area of the hue map where a cluster of hue data cells are present that have notable hue values relative to a hue threshold and may depict a potential object having a notable size and shape. For example, a hue object may be designated because a cluster of hue data cells have a hue value notably different than surrounding hue values. By way of further example, if a cluster of red hue data values arising from the shirt 46 and the shorts 48, or the flesh tone hue data values arising from the face, arms, and legs of the child such as a shirt worn by a person was present over a background of green grass, blue sky, white concrete driveway, or black asphalt parking lot, the hue values of the clusters may differ from the hue values of the backgrounds by a notable amount, for example the hue value of the clusters may differ from the background by an amount greater than 30. Alternatively, a hue object may be designated only on the basis of the hue value and regardless of how a particular hue value differs from a perceived background. For example, a hue object may be designated simply because the hue values of a cluster of hue data cells is less than 20 and so is substantially red, or the hue values correspond to various flesh tones. Furthermore, a cluster of data cells may be designated a hue object because the cluster is neither too small because the object is too small or too far away to be a concern, or too large, for example when the entire camera field of view is red because the vehicle is backed against a red building. It should be appreciate that the specific thresholds are determined based on the area covered by the camera field of view 22, the resolution or number of pixels of the camera 16, where the camera 16 is mounted on the vehicle 12, range based upon vehicle movement mechanics, operator reaction time, and many other considerations including empirical testing, as will be recognized by those in the art.

Figure 5:
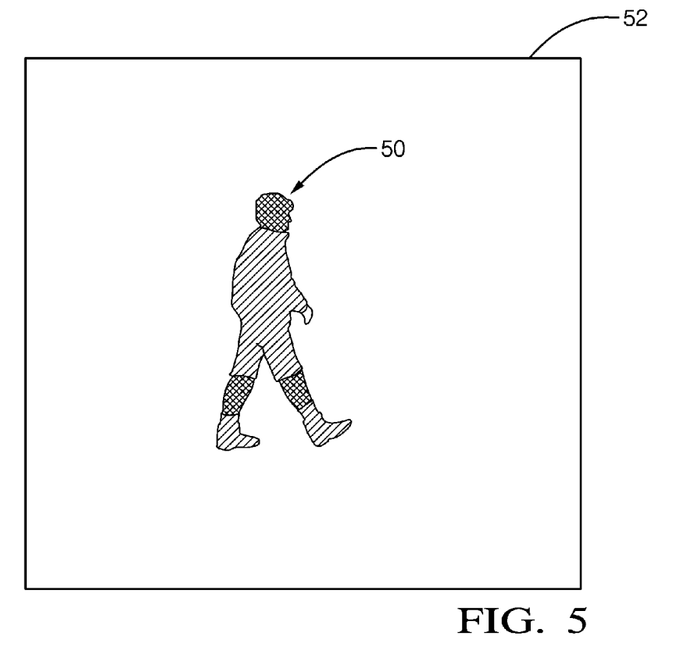
FIG. 5 is an illustration depicting a data map stored by the system of FIG. 1 in accordance with one embodiment.

FIG. 5 illustrates a non-limiting example of a hue object 50 present on a hue map 52 corresponding to the child (object 14) illustrated in FIG. 4. It is noted that the driveway 42 and lawn 44 of FIG. 4 are not depicted by the hue map 52 because they would be excluded by object detection rules based on hue value, size, and/or shape of the driveway 42 and the lawn 44. The illustration suggests that the hue value for the shirt and shorts is different than the hue value for the face, arms, and legs. Here again, the effects of pixilation are not shown only for the purpose of simplifying the illustrations.

Step 320, EXPAND HUE OBJECT, is an optional step that may include increasing the number of hue data cells designated as part of the hue object based on one or more of a hue object shape and a hue object size. As described above, expanding the number of data cells associated with a potential object helps to avoid a failure to detect small objects because of misalignment of the camera field of view 22 and the sensor field of view 24. As suggested above and will become apparent in the further description that follows, if an object is small and the fields of view are misaligned, there is a risk that no intersection of image data based cells and temperature data based cells will occur. As such, the percentage or degree of expansion will typically be greater for small potential objects as compared to large potential objects.

Figure 6:
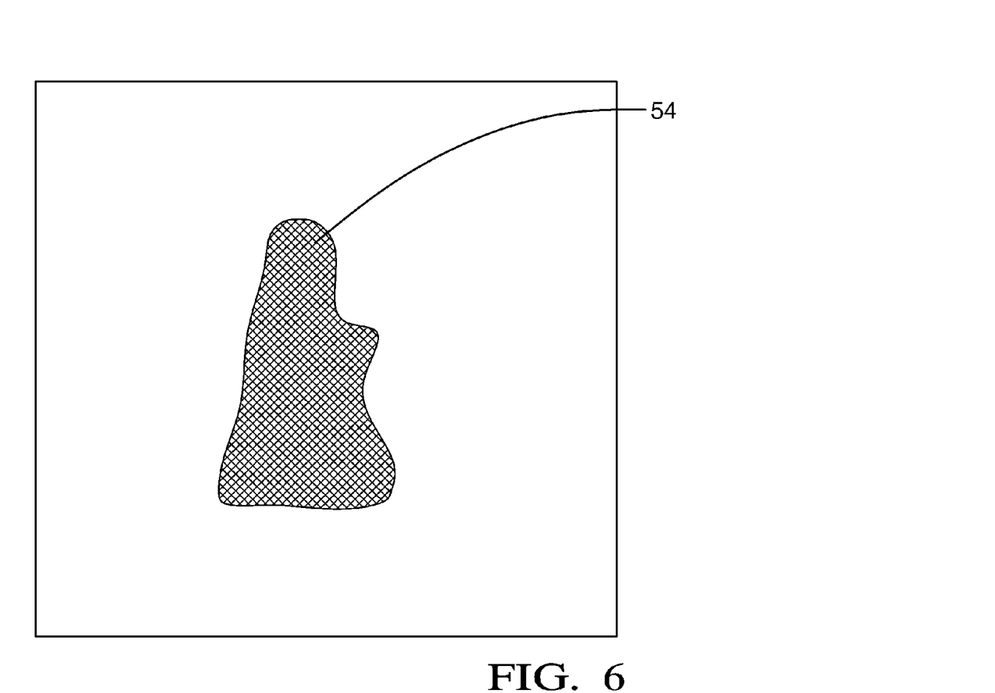
FIG. 6 is an illustration depicting a data map stored by the system of FIG. 1 in accordance with one embodiment.

FIG. 6 illustrates a non-limiting example of the effect of expanding the hue object 50 to become an expanded hue object 54. A way to accomplish this is to change the hue values of data cells on the hue map 52 proximate to and outside the hue object 50 to a data cell value that corresponds to that of the hue object 50. In this non-limiting example, the illustration suggests that all of the data cell hue values of the expanded hue object 54 are the same only for the purpose of simplifying the illustration. It should be understood that the expanded hue object 54 could be depicted by data cell values that help to maintain the distinction of the data cells for the shirt 46 and shorts 48 from the face, arms, and legs of the child.

It should be recognized that a potential object will appear smaller on a map of the image the further away the potential object is from the camera 16. Also, the location of the bottom of the potential object on the map may be used as an indication of a distance between the camera 16 and the potential object. As such the location on the map of the bottom of the potential object may also be used to determine the percentage or degree of expansion that should be applied to an object. Also, images of long narrow objects such as flag poles and curbs may be expanded to a different percentage or degree of expansion than an object having an aspect ratio closer to one-to-one such as a child standing behind the vehicle. Also, as suggested by the illustration of the expanded hue object 54, the amount or factor of expansion applied to an object may be greater at the bottom than at the top in order to compensate for the lower rows of an object map being potentially closer to the camera 16 than the upper rows of the object map.

Step 325, DETERMINE SATURATION MAP, may include d) determining a saturation map characterized as an array of saturation data cells, wherein each saturation data cell has a saturation value based on a saturation characteristic of the image data detected by of one or more of the pixels. By way of example and not limitation, the saturation value may be indicated by a number between 0 and 100 corresponding to a percentage of color saturation detected by the corresponding pixel in the camera 16.

Step 330, DESIGNATE SATUATION OBJECT, may include e) designating a saturation object on an area of the saturation map where a cluster of saturation data cells are present that have notable saturation values relative to a saturation threshold. Referring to FIG. 4 as the example scene 40, FIG. 5 may also be used as an example saturation map (52) depicting a saturation object (50). Similar to determining the hue object 50, the saturation object may be determined based on a cluster of saturation data cells having saturation values that stand in distinct contrast to the saturation values associated with the surrounding background. For example the saturation value of the shirt 46 and shorts 48, or the saturation values associated with the flesh tones of the child's face, arms, and legs, may be notably different that the saturation values for the driveway 42. Alternatively, the saturation values for the shirt 46 and the shorts 48 may be such that only those objects are designated as a saturation object because some flesh tones of some persons would not have particularly notable saturation values.

Step 335, EXPAND SATURATION OBJECT, like the other expand steps, is an optional step that may include increasing the number of saturation data cells designated as part of the saturation object based on one or more of a saturation object shape and a saturation object size. It should be appreciated that an expanded saturation object may be comparable to the expanded hue object of FIG. 6, and that the advantage of expanding the saturation object is the same as the hue object, that being reducing the risk of failing to have a saturation object intersect with a portion of the thermal object described below.

Step 340, DETERMINE INTENSITY MAP, may include f) determining an intensity map characterized as an array of intensity data cells, wherein each intensity data cell has an intensity value based on an intensity characteristic of the image data detected by of one or more of the pixels. By way of example and not limitation, the intensity value may be expressed as a number between 0 and 100 to indicate a relative value, or the intensity value may be expressed as a number corresponding to a particular unit of intensity measure per unit area such as illuminance in lumens per square centimeter.

Step 345, DESIGNATE INTENSITY OBJECT, may include g) designating an intensity object on an area of the intensity map where a cluster of intensity data cells are present that have notable intensity values relative to an intensity threshold. Similar to determining the hue object 50 and the saturation object, the intensity object may be determined based on a cluster of intensity data cells having intensity values that stand in distinct contrast to the intensity values associated with the surrounding background. For example the intensity value of the shirt 46 and shorts 48, or the intensity values associated with the flesh tones of the child's face, arms, and legs, may be notably different that the intensity values for the driveway 42. Alternatively, the intensity values for the shirt 46 and the shorts 48 may be such that only those objects are designated as a saturation object because some flesh tones of some persons would not have particularly notable intensity values.

Step 350, EXPAND INTENSITY OBJECT, like the other expand steps, is an optional step that may include increasing the number of intensity data cells designated as the intensity object based on one or more of an intensity object shape and an intensity object size. It should be appreciated that an expanded intensity object may be comparable to the expanded hue object of FIG. 6, and that the advantage of expanding the intensity object is the same as the hue object, that being reducing the risk of failing to have an intensity object intersect with a portion of the thermal object described below.

Figure 7:
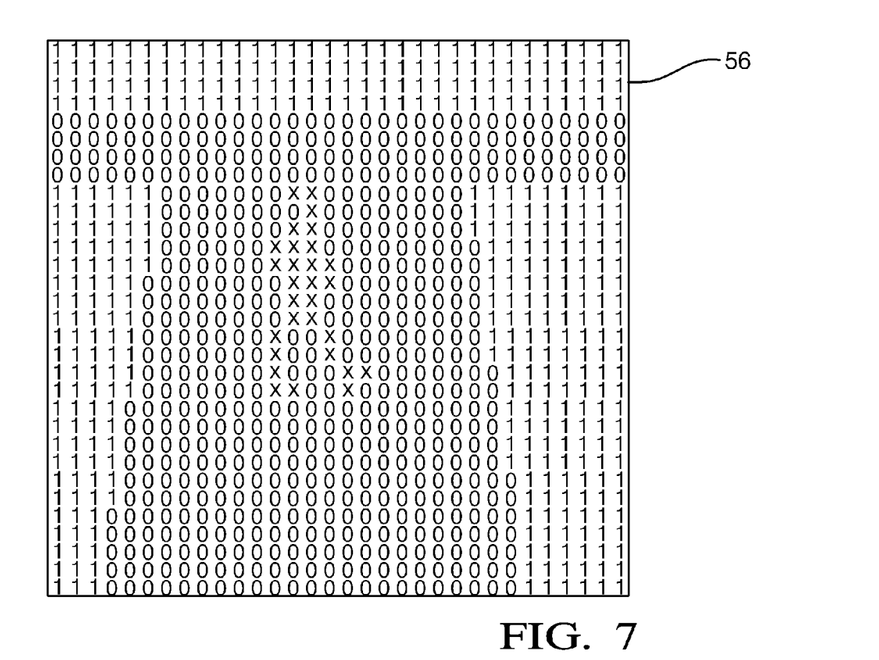
FIG. 7 is an illustration depicting a data map stored by the system of FIG. 1 in accordance with one embodiment.

Step 355, RECEIVE TEMPERATURE DATA, may include h) receiving temperature data from the multiple zone temperature sensor (the sensor 18), wherein said temperature data includes a zone temperature value for each of the multiple zones. FIG. 7 illustrates a non-limiting example of temperature values detected by a 32 by 31 thermopile array. It is understood that the zone temperature values would correspond to an actual temperature; however, for the purpose of simplifying the illustration, the thermopiles directed to areas corresponding to the driveway 42 are labeled as '0', the thermopiles directed to areas corresponding to the lawn 44 are labeled as '1', the thermopiles directed to areas corresponding to the object 14 are labeled as 'X'.

Step 360, DETERMINE TEMPERATURE MAP, may include i) determining a temperature map 56 characterized as an array of temperature data cells, wherein each temperature data cell has a temperature value based on a temperature characteristic of one or more of the multiple zones. Determining the temperature map 56 may include determining a background temperature value based on the zone temperature value of at least one zone, or the average value of several selected zones, or based on an average value of all the temperature zones. Determining a differential temperature value for each zone may be based on a difference between the background temperature value and the corresponding zone temperature value.

Figure 8:
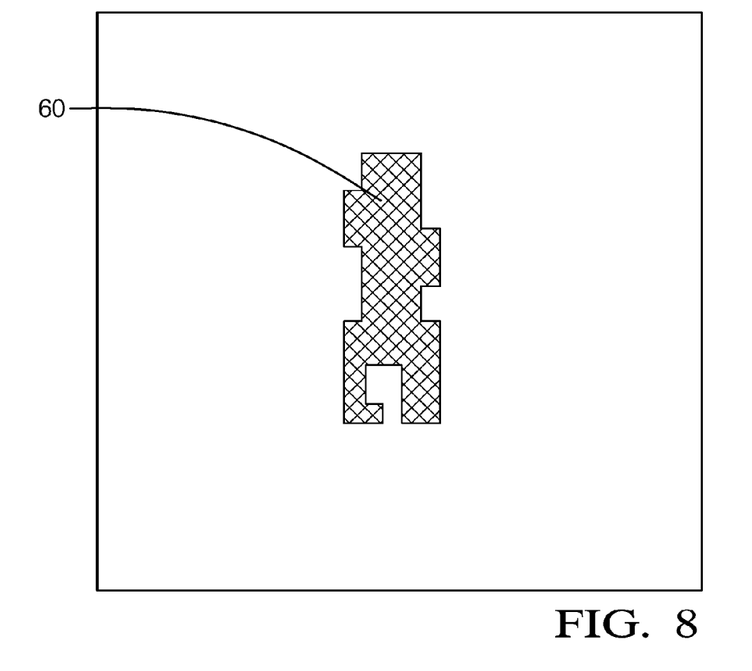
FIG. 8 is an illustration depicting a data map stored by the system of FIG. 1 in accordance with one embodiment.

Step 365, DESIGNATE TEMPERATURE OBJECT, may include j) designating a temperature object 60 (FIG. 8) on an area of the temperature map where a cluster of temperature data cells are present that have notable temperature values relative to a temperature threshold. For example, the temperature data illustrated in FIG. 7 may be converted into a thermal binary map 58 based on a comparison of the differential temperature value to a differential temperature threshold value. FIG. 8 illustrates a non-limiting example of the temperature object 60 based on such the thermal binary map that may arise based on the example scene 40 of FIG. 4.

Step 370, EXPAND TEMPERATURE OBJECT, like the other expand steps, is an optional step that may include increasing the number of temperature data cells designated as the temperature object 60 based on one or more of a temperature object shape and a temperature object size. It should be appreciated that an expanded intensity object may be comparable to the expanded hue object of FIG. 6; however the expanded temperature object may still have the highly pixelated shape shown in FIG. 8, or other image processing may be used to give the expanded temperature object a more rounded, smooth shape. As before, the advantage of expanding the temperature object is the same as the hue object, that being reducing the risk of failing to have the temperature object intersect with a portion of the camera based objects (hue, saturation, and intensity) described above.

Figure 9:
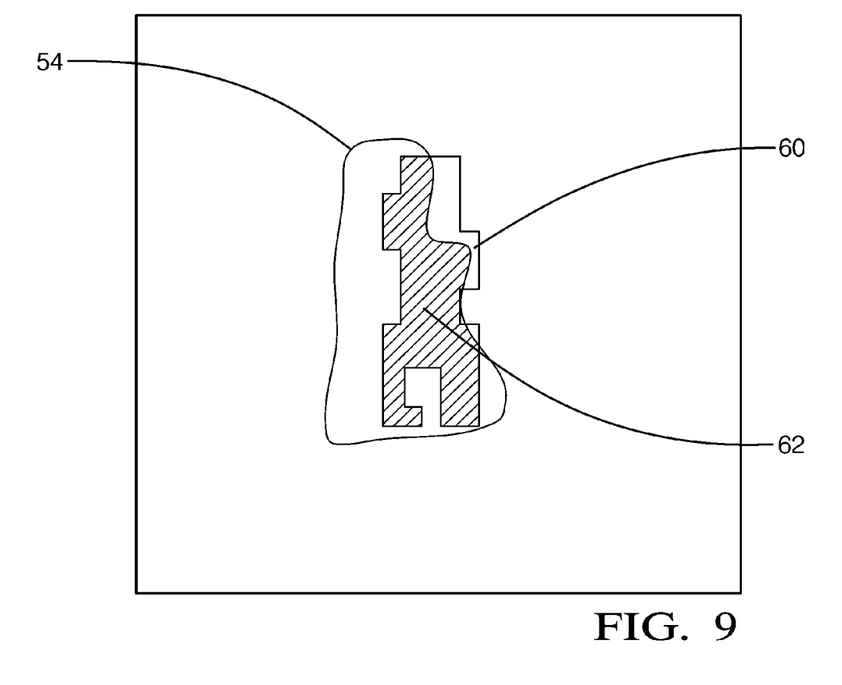
FIG. 9 is an illustration depicting a data map stored by the system of FIG. 1 in accordance with one embodiment.

Step 375, DESIGNATE DETECTED OBJECT, may include k) designating a detected object 62 on an area of an object map where the hue object, the intensity object, and the temperature object intersect, or where the saturation object, the intensity object, and the temperature object intersect. FIG. 9 illustrates a non-limiting example of the detected object 62 at the intersection of the expanded hue object 54 and the temperature object 60. The intensity object is not illustrated only for the purpose of simplifying the illustration, but it should be understood that the intensity object could be exactly the same as the hue object. If the intensity object were different than the hue object, then it is expected that the intersection area would likely be smaller.

Designating the detected object 62 may include other tests such as determining that the detected object 62 persists for a time longer than a persistence time threshold, for example more than 0.1 seconds, or more than three frames when the image frame rate is thirty frames per second. Designating the detected object 62 may include determining that the detected object moves at a speed less than a speed threshold representative of an object's maximum movement. This may be helpful to determine that an object will be out of the way of the vehicle 12 when backing, and so does not need to be brought to the attention of the operator 20.

Step 380, ACTIVATE WARNING INDICATOR, may include the controller 30 generating or outputting a warning signal 38 when the detected object 62 is detected or confirmed.

Figure 10:
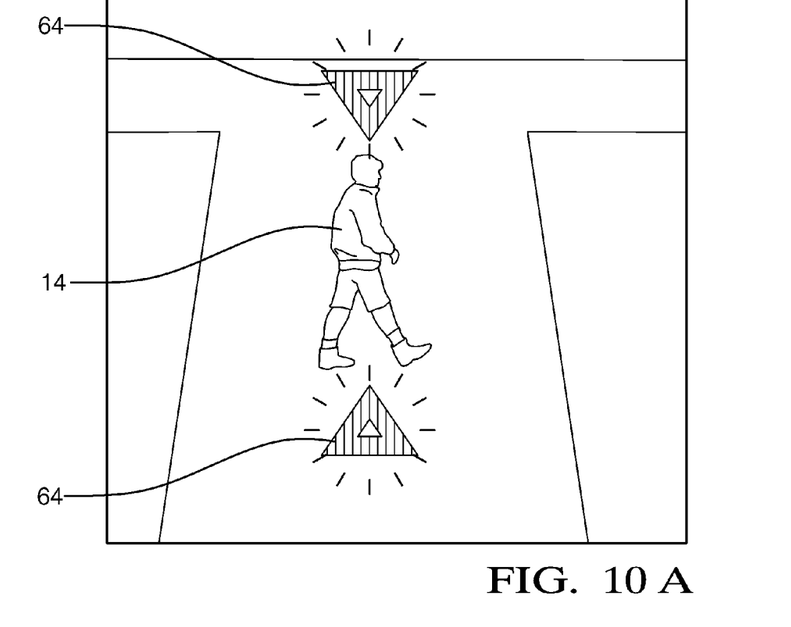
FIGS. 10A and 10B illustrate images displayed by the system of FIG. 1 in accordance with alternate embodiments.

Step 385, DISPLAY HIGHLIGHTED IMAGE, may include l) displaying on a display 32 an image from the camera 16 that includes a highlighted area selected based on the detected object 62. By way of example and not limitation, the display 32 may show an image comparable the example scene 40 shown in FIG. 4, and then highlighting a region of the image by A) flashing a red triangle 64 above and/or below the object 14 (FIG. 10A), B) overlaying the object 14 with a flashing red tinted region corresponding to the expanded hue object 54 shown FIG. 6, or the temperature object 60 shown in FIG. 8, or C) overlay the object 14 with a rectangle 66 (FIG. 10B) or other polygon suitable to attract the attention of the operator 20 and make it easier to for the operator to identify what the system 10 has determined is at risk of a collision.

Accordingly, a system 10, a controller 30 for the system 10 and a method 300 to provide a notification to an operator 20 of a vehicle 12 that an object 14 is proximate to the vehicle 12 is provided. The system 10 enhances what is shown on the display 32 by fusing information from a visible light camera 16 and a multiple zone temperature sensor 18 to improve object detection and highlight the image on the display in a way so the operator 20 can more readily identify the object 14. Furthermore, potential objects detected by the camera 16 and/or the sensor 18 may be expanded to increase the likelihood that data maps of the expanded potential objects will be more likely to have intersecting potential objects and thereby reduce the risk of failing to detect an object due to misalignment of the camera 16 and sensor 18 fields of view.

While this invention has been described in terms of the preferred embodiments thereof, it is not intended to be so limited, but rather only to the extent set forth in the claims that follow.

We claim:

1. A system to provide a notification to an operator of a vehicle that an object is proximate to the vehicle, said system comprising
   a visible light camera mounted on the vehicle effective to have a camera field of view, and configured to output image data indicative of visible light color and visible light intensity detected by pixels in the camera;
   a multiple zone temperature sensor mounted on the vehicle effective to have a sensor field of view similar to the camera field of view, and configured to output temperature data indicative of a zone temperature for each of the multiple zones; and
   a controller configured to
   a) receive visible light image data from the camera, said image data indicative of visible light color and visible light intensity detected by pixels in the camera;
   b) determine a hue map characterized as an array of hue data cells, wherein each hue data cell has a hue value based on a hue characteristic of the image data detected by of one or more of the pixels;
   c) designate a hue object on an area of the hue map where a cluster of hue data cells are present that have notable hue values relative to a hue threshold;
   d) determine a saturation map characterized as an array of saturation data cells, wherein each saturation data cell has a saturation value based on a saturation characteristic of the image data detected by of one or more of the pixels;
   e) designate a saturation object on an area of the saturation map where a cluster of saturation data cells are present that have notable saturation values relative to a saturation threshold;
   f) determine an intensity map characterized as an array of intensity data cells, wherein each intensity data cell has an intensity value based on an intensity characteristic of the image data detected by of one or more of the pixels;
   g) designate an intensity object on an area of the intensity map where a cluster of intensity data cells are present that have notable intensity values relative to an intensity threshold;
   h) receive temperature data from the multiple zone temperature sensor, wherein said temperature data includes a zone temperature value for each of the multiple zones;
   i) determine a temperature map characterized as an array of temperature data cells, wherein each temperature data cell has a temperature value based on a temperature characteristic of one or more of the multiple zones;
   j) designate a temperature object on an area of the temperature map where a cluster of temperature data cells are present that have notable temperature values relative to a temperature threshold;
   k) designate a detected object on an area of an object map where the hue object, the intensity object, and the temperature object intersect, or where the saturation object, the intensity object, and the temperature object intersect; and
   l) output a display signal corresponding to an image from the camera that includes a highlighted area selected based on the detected object.

2. The system in accordance with claim 1, wherein the camera has more than 100,000 pixels, and the multiple zone heat sensor has fewer than 1000 zones.

3. The system in accordance with claim 1, said system further comprising a warning indicator coupled to the controller effective to generate a warning signal when the detected object is detected.

4. A method to provide a notification to an operator of a vehicle that an object is proximate to the vehicle, said notification based on image data from a visible light camera mounted on the vehicle effective to have a camera field of view, and a multiple zone temperature sensor mounted on the vehicle effective to have a sensor field of view similar to the camera field of view, said method comprising:
   a) receiving visible light image data from the camera, said image data indicative of visible light color and visible light intensity detected by pixels in the camera;
   b) determining a hue map characterized as an array of hue data cells, wherein each hue data cell has a hue value based on a hue characteristic of the image data detected by of one or more of the pixels;
   c) designating a hue object on an area of the hue map where a cluster of hue data cells are present that have notable hue values relative to a hue threshold;
   d) determining a saturation map characterized as an array of saturation data cells, wherein each saturation data cell has a saturation value based on a saturation characteristic of the image data detected by of one or more of the pixels;
   e) designating a saturation object on an area of the saturation map where a cluster of saturation data cells are present that have notable saturation values relative to a saturation threshold;
   f) determining an intensity map characterized as an array of intensity data cells, wherein each intensity data cell has an intensity value based on an intensity characteristic of the image data detected by of one or more of the pixels;
   g) designating an intensity object on an area of the intensity map where a cluster of intensity data cells are present that have notable intensity values relative to an intensity threshold;
   h) receiving temperature data from the multiple zone temperature sensor, wherein said temperature data includes a zone temperature value for each of the multiple zones;

i) determining a temperature map characterized as an array of temperature data cells, wherein each temperature data cell has a temperature value based on a temperature characteristic of one or more of the multiple zones;

j) designating a temperature object on an area of the temperature map where a cluster of temperature data cells are present that have notable temperature values relative to a temperature threshold;

k) designating a detected object on an area of an object map where the hue object, the intensity object, and the temperature object intersect, or where the saturation object, the intensity object, and the temperature object intersect; and l) displaying on a display an image from the camera that includes a highlighted area selected based on the detected object.

5. The method in accordance with claim 4, wherein said method further comprises generating a warning signal when the detected object is detected.

6. The method in accordance with claim 4, wherein said method further comprises increasing the number of hue data cells designated as the hue object based on one or more of a hue object shape and a hue object size.

7. The method in accordance with claim 4, wherein said method further comprises increasing the number of saturation data cells designated as the saturation object based on one or more of a saturation object shape and a saturation object size.

8. The method in accordance with claim 4, wherein said method further comprises increasing the number of intensity data cells designated as the intensity object based on one or more of an intensity object shape and an intensity object size.

9. The method in accordance with claim 4, wherein said method further comprises increasing the number of temperature data cells designated as the temperature object based on one or more of a temperature object shape and a temperature object size.

10. The method in accordance with claim 4, wherein the step of designating a detected object based on an object map includes determining that the detected object persists for a time longer than a persistence time threshold.

11. The method in accordance with claim 4, wherein the step of designating as a detected object an area on an object map includes determining that the detected object moves at a speed less than a speed threshold.

12. The method in accordance with claim 4, wherein determining a temperature map includes
   determining a background temperature value based on the zone temperature value of at least one zone;
   determining a differential temperature value for each zone based on a difference between the background temperature value and the corresponding zone temperature value; and
   generating a thermal binary map based on a comparison of the differential temperature value to a differential temperature threshold value.

13. A controller for a system configured to provide a notification to an operator of a vehicle that an object is proximate to the vehicle, said system comprising a visible light camera mounted on the vehicle effective to have a camera field of view, and configured to output image data indicative of visible light color and visible light intensity detected by pixels in the camera, and a multiple zone temperature sensor mounted on the vehicle effective to have a sensor field of view similar to the camera field of view, and configured to output temperature data indicative of a zone temperature for each of the multiple zones, said controller configured to a) receive visible light image data from the camera, said image data indicative of visible light color and visible light intensity detected by pixels in the camera;

b) determine a hue map characterized as an array of hue data cells, wherein each hue data cell has a hue value based on a hue characteristic of the image data detected by of one or more of the pixels;

c) designate a hue object on an area of the hue map where a cluster of hue data cells are present that have notable hue values relative to a hue threshold;

d) determine a saturation map characterized as an array of saturation data cells, wherein each saturation data cell has a saturation value based on a saturation characteristic of the image data detected by of one or more of the pixels;

e) designate a saturation object on an area of the saturation map where a cluster of saturation data cells are present that have notable saturation values relative to a saturation threshold;

f) determine an intensity map characterized as an array of intensity data cells, wherein each intensity data cell has an intensity value based on an intensity characteristic of the image data detected by of one or more of the pixels;

g) designate an intensity object on an area of the intensity map where a cluster of intensity data cells are present that have notable intensity values relative to an intensity threshold;

h) receive temperature data from the multiple zone temperature sensor, wherein said temperature data includes a zone temperature value for each of the multiple zones;

i) determine a temperature map characterized as an array of temperature data cells, wherein each temperature data cell has a temperature value based on a temperature characteristic of one or more of the multiple zones;

j) designate a temperature object on an area of the temperature map where a cluster of temperature data cells are present that have notable temperature values relative to a temperature threshold;

k) designate a detected object on an area of an object map where the hue object, the intensity object, and the temperature object intersect, or where the saturation object, the intensity object, and the temperature object intersect; and l) output a display signal corresponding to an image from the camera that includes a highlighted area selected based on the detected object.

* * * * *